Feb. 15, 1966 S. PLAISANCE 3,235,741

SWITCH

Filed April 24, 1961

2 Sheets-Sheet 1

INVENTOR.
STANLEY PLAISANCE

BY Alan K. Roberts

ATTORNEY

Feb. 15, 1966 S. PLAISANCE 3,235,741

SWITCH

Filed April 24, 1961 2 Sheets-Sheet 2

INVENTOR.
STANLEY PLAISANCE

BY Alan K. Roberts

ATTORNEY

United States Patent Office 3,235,741

Patented Feb. 15, 1966

3,235,741

SWITCH

Stanley Plaisance, Newton Center, Mass., assignor to Invac Corporation, Waltham, Mass.

Filed Apr. 24, 1961, Ser. No. 105,101

7 Claims. (Cl. 250—229)

This invention relates to apparatus for causing an electrical signal to change state in response to the application of a mechanical force and to methods for preparing such apparatus.

It is an object of the invention to provide an improved switch structure which avoids the deficiencies inherent in conventional mechanical switches and the like.

More particularly, it is an object of the invention to provide an improved switch the mechanical components of which are extremely reliable and which switch is adapted for prolonged operation without failure.

A further object of the invention is to provide an improved switch the operation of which is virtually unaffected by dust, corrosion, tarnishing and so forth.

Still another object of the invention is to provide an improved switch in which contact bounce or chatter is avoided.

Yet another object of the invention is to provide an improved switch the resistance or impedance of which remains predictable during prolonged periods of use.

Briefly, to achieve the above and other of its objectives, the invention contemplates the provision of a switch structure employing a source of radiated energy and a device responsive to this radiated energy, there being further provided means responsive to the application of mechanical forces for selectively shielding said device from said source, said source device being adapted to change state according to whether or not it is exposed to the source. Furthermore, there is provided means which positions and supports said source, device and shielding means in substantially fixed relationship.

According to a feature of the invention, the supporting means serves the further purpose of shielding the radiated energy responsive device from stray and ambient radiated energy. Moreover, the supporting means preferably and advantageously passes the radiated energy from said source directly to the energy responsive device so that the source can be operated with optimum efficiency for prolonging the life thereof.

In accordance with a further feature of the invention, the supporting means is preferably of a material adapted for heat transfer whereby heat generated by the source of radiated energy may be efficiently dissipated.

Advantageously, as will become apparent hereinunder, switches of the invention operate with a minimum of inertia and under certain circumstances can even be gravitationally operated.

Still another feature of the invention is that structures provided in accordance therewith are admirably suited for use as logical components in computers and the like. Thus, for example, as will be shown, an "and" component or an "or" component may be readily provided in accordance with the teachings of the invention.

A further advantage of the invention is that switches provided in accordance therewith are readily employed as machine or keyboard components for typewriters, data input apparatus, and the like.

Furthermore, a feature of the invention is that limit or transfer switches are readily provided in accordance with the provisions thereof.

Although the invention preferably contemplates the use of light sources in conjunction with light responsive elements, it will be readily seen that the provisions of the invention are equally applicable to other types of radiant energy elements involving the use, for example, of heat, radioactive, and infra-red energy and so forth.

A further feature of the invention is that output wave forms may be controlled by simple mechanical expedients effected during the construction of the associated switch.

The above and other objects and advantages of the invention, as well as further features thereof will become apparent from the following detailed description of some preferred embodiments as illustrated in the accompanying drawing in which.

Figure 1:
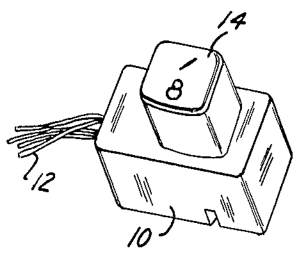
FIGURE 1 is a pictorial view of a switch structure provided in accordance with the invention.

FIG. 1 illustrates, in pictorial view, a self-contained switch structure provided in accordance with the invention. Basically, this structure comprises a housing or block 10 wherein the active elements of the switch are supported, the switch being provided with power by means of leads 12 and being controlled by means of a key 14.

Figure 2:
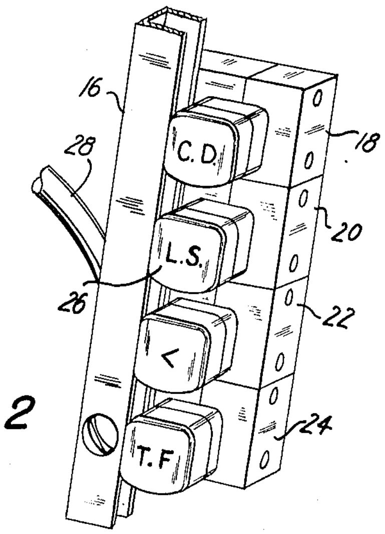
FIGURE 2 is a pictorial view of an entire bank of switches provided in accordance with the invention.

FIG. 2 illustrates how the switch structure of FIG. 1 is readily incorporated into a bank of switches which, in turn, is readily incorporated into a keyboard of a typewriter or data input apparatus, or the like.

In FIG. 2 is generally indicated a support 16 on which are mounted switches 18, 20, 22 and 24 operated by keys 26 and supplied with power via a cable 28.

Figure 3:
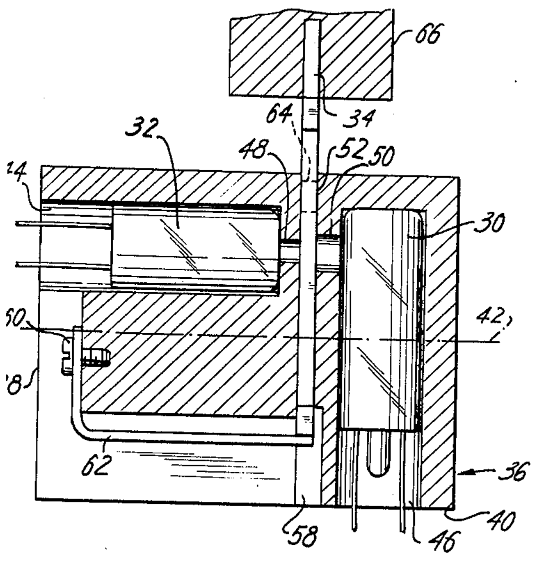
FIGURE 3 is a side view, partially in longitudinal section, of a preferred embodiment of the invention.
Figure 4:
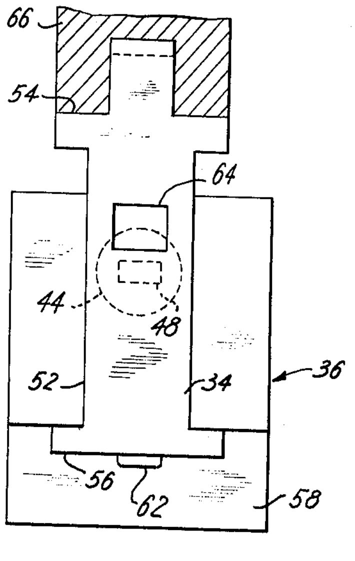
FIGURE 4 is an end view of the switch of FIG. 3, with a section of the housing removed.

FIGS. 3 and 4 illustrate the structural details of a switch of the type shown pictorially in FIGS. 1 and 2.

The structure of FIGS. 3 and 4, as do the various other embodiments of the invention, generally comprises a source of radiated or radiant energy 30, a means 32 responsive to radiant energy of the type generated by source 30, and a means 34 for selectively shielding and/or exposing means 32 with respect to source 30.

Source 30 is preferably a light source or light generating means. For example, the source 30 can be a conventional miniature incandescent bulb or the like. In a preferred arrangement, the source 30 is, by way of example, a twenty-four volt incandescent bulb. This bulb is actually operated in practice at twelve volts in order to increase the life of said source whereby failure of the source becomes an insignificant factor.

Means 32, as noted above, is a device which is responsive to radiant energy of the type provided by source 30. When source 30 is a light generating device, means 32 is a light responsive element such as a photoelectric cell or a photoconductor. Such devices are conventionally available and may, for example, be selected from a class of photoconductors employing a light senstive material such as CdSe. Photoconductor type CL603AL (Clairex) is an example.

Means 34 is a radiant energy intercepting device such as a shutter made of a material impermeable to the type of energy provided by source 30. When source 30 is a light generating device, means 34 is a shutter impermeable to light other than as will be indicated hereinafter.

Elements 30, 32 and 34 are generally positioned and supported in substantially fixed attitude as a small portable unit by a means 36 consisting of sections 38 and 40. Sections 38 and 40 are adapted for being aligned on a common longitudinal axis 42 in face-to-face relation.

Section 38 is provided with a bore or receptacle 44 for accommodating energy responsive means 32, whereas section 40 is provided with a bore or receptacle 46 adapted for accommodating source 30.

Sections 38 and 40 are provided with coaxial passages 48 and 50 by means of which bores 44 and 46 are exposed to one another. Further, in one of the mutually engaged faces of sections 38 or 40, there is provided a slot 52 arranged between bores 44 and 46, as well as in intersecting relationship with passages 48 and 50. Slot 52 constitutes a guideway or slideway for shutter 34, the shutter 34 being vertically displaceable in said slot.

The shape of passage 48 and its position relative to bore 44 is best seen in FIG. 4 wherein it may be noted that shutter 34 is additionally provided with lateral extensions 54 and 56, the breadth of which exceeds the width of slot 52 so that the shutter 34 is effectively locked to supporting means 36.

Slot 52 opens downwardly into a transverse slot or opening 58 wherein are accommodated lateral extensions 56. The length of slot 52 is less than the distance between lateral extensions 54 and 56 to permit a determinable displacement in a vertical direction of the shutter 34.

Attached to section 38 by means of a screw 60 is a resilient member 62 having the form of a leaf spring fabricated, for example, of spring steel. Resilient member 62 engages shutter 34 at the bottom thereof and yieldably maintains the same in a normal position of rest, extending most fully from block 10 with the lateral extensions 56 abutting against the upper limits of slot 58. Resilient member 62 may be omitted under certain circumstances and the shutter returned to rest position gravitationally if the switch is mounted in inverted position.

Shutter 34 is provided with a light passage or window 64 of rectangular shape. The displacement of window 64 downwardly to correspond with the position of passages 48 and 52 provides for the passage of radiant energy from source 30 to radiant energy responsive device 32. Thus, device 32 is selectively exposed to or shielded from source 30 in accordance with the positioning of window 64 and thus in accordance with the position of shutter 34. Preferably, the window and passage are shaped and relatively displaced so that small accidental movements of the shutter will be ineffective.

In the embodiment illustrated there is mounted atop shutter 34, a key 66, the depression of which overcomes the resistance of spring 62 and causes a displacement of the shutter 34 as aforesaid. Alternatively, the key may be replaced by cam mechanisms and so forth.

Sections 36 and 38 cooperatively constitute a block or housing preferably fabricated from a material adapted for efficient heat conduction. This material may, for example, be aluminum or the like, but may alternatively be of other materials such as plastic or the like having sufficient structural strength where the dissipation of heat is not a consideration.

In the above noted structure, a switching operation or a change of electrical state is effected by mechanical forces applied to key 66, such forces causing a displacement of shutter 34 and a selective exposing of device 32 to source 30. Device 32 when, for example, constituted by a photoconductor or the like generally possesses a characteristic resistance which is altered when the photoconductor is exposed to light in accordance with well known theory. Thus, the invention provides a device adapted for changing electrical states in response to mechanical forces.

The arrangement of FIGS. 3 and 4 employs a single window 64 or rectangular shape in operative association with a passage such as the passage 48 in FIG. 4. The relative size of these openings militates in favor of a sharp and precise switching action. In addition, the structure which has been described is notably free of disturbance by dust, dirt and tarnishing as is harmful in conventional switches employing selectively engaging contacts. Furthermore, the structure described is capable of operation with optimum reliability and is substantially inertialess. The resistance of this switch in an electric circuit is substantially constant and is thus predictable over prolonged periods of use as compared with conventional switches wherein the resistance varies as the switch contacts tarnish or otherwise deteriorate. The switch of the invention will, moreover, not arc over or suffer from similar defective types of operation.

Figure 5:
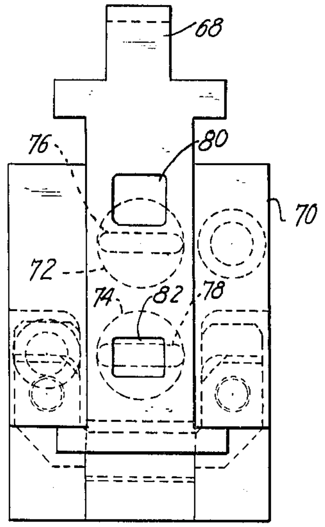
FIGURE 5 is a view similar to that of FIG. 4, illustrating a further embodiment of the invention.

FIG. 5 illustrates a transfer switch provided in accordance with the invention. In this switch is employed a shutter 68 slidable in a section 70. Section 70, as distinguished from the previously described embodiment, houses two photoconductor or light responsive devices 72 and 74 which are operatively associated with a light source (not shown) spaced from these light responsive devices as in the prior embodiment. Passages 76 and 78 lead respectively to light responsive devices 72 and 74.

In accordance with the embodiment of FIG. 5, shutter 68 is provided with two windows or openings 80 and 82. Windows 80 and 82 are spaced by a distance which is different from the distance separating devices 72 and 74. This arrangement is such that only one of the devices 72 or 74 will be exposed to the associated light source at a given time.

In the position of shutter 68 illustrated in FIG. 5, light responsive device 74 is exposed by passage 78 and window 82 to the associated light source (not shown). Passage 76 is, however, blocked by shutter 68 and device 72 is isolated from said light source.

When, however, shutter 68 is displaced vertically downwards, window 80 comes into registration with passage 76 and exposes device 72 to the light source. At the same time, window 82 moves out of alignment with passage 78 and the light source is then isolated from the light responsive device 74.

The structure illustrated in FIG. 5 constitutes a transfer switch inasmuch as only one of the devices 72 or 74 is actuated at a given time and the function thereof is selectively transferred from one device to the other as well as between the circuits (not shown) connected to these devices.

Figure 6:
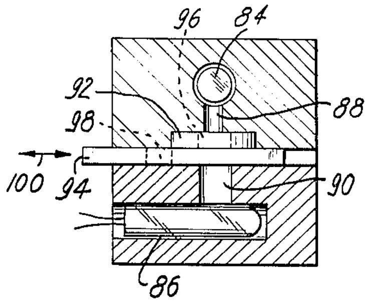
FIGURE 6 is a top view, partially in section, illustrating a logical component provided in accordance with the invention.

FIG. 6 illustrates a logical component provided in accordance with a further embodiment of the invention.

More particularly, this local component is an "and" element. Stated otherwise, it is the function of the switch of FIG. 6 to exhibit a change of state in response to the simultaneous application of two separate and distinct mechanical forces.

In FIG. 6 are diagrammatically illustrated a light source 84 and a light responsive device 86, these elements being adapted for exposure to one another by means of passages 88 and 90. In this embodiment of the invention, two shutters 92 and 94 are provided, each having formed therein a window 96 or 98 respectively.

Shutter 92 is displaceable vertically relative to the plane of the drawing in order to move window 96 into alignment with passages 88 and 90. Shutter 94 is displaceable as indicated by arrow 100 in order to move window 98 selectively into or out of registration with passages 88 and 90. When both shutter 92 and 94 are displaced to predetermined positions whereby windows 96 and 98 are simultaneously in registration with passages 88 and 90, light responsive device 86 is exposed to light source 84 and a change of state occurs in light responsive device 86. When either one of windows 96 or 98, or both of these windows, is out of registration with passages 88 and 90, light responsive device 86 is isolated from source 84 and device 86 retains its normal condition.

It thus follows that the structure of FIG. 6 is a logical "and" component responsive to the simultaneuos application of separate mechanical forces to effect a change of state or a switching operation.

Figure 7:
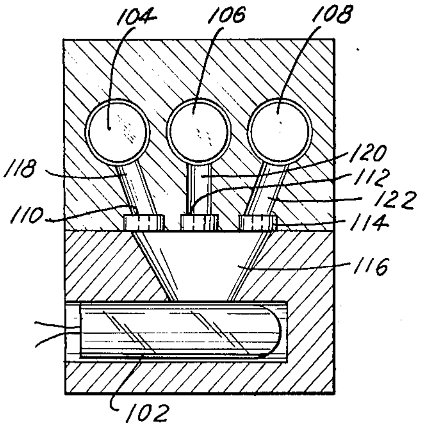
FIGURE 7 is a view similar to that of FIG. 6 illustrating a further type of logical component provided in accordance with the invention.

The structure illustrated in FIG. 7 is a logical "or" component. This component responds to the application of any one of a plurality of forces to generate an output signal exhibited as, or controlled by, the change of state in light responsive device 102. In this embodiment there are employed three separate and distinct light sources 104, 106 and 108 and corresponding shutters 110, 112 and 114, each shutter being provided with a window.

Directed at light responsive device is a pyrimidal or conically shaped opening or passage 116 with which are aligned passages 118, 120 and 122 corresponding to light sources 104, 106 and 108.

From the embodiments which have been heretofore described, it will be readily understood that registration of the windows of any of shutters 110, 112 and 114 with the associated passage will expose light responsive device 102 to the corresponding source 104, 106 or 108. Thus, it follows that the structure of FIG. 7 is a logical "or" component which exhibits a change of state in response to the application thereto of one of a number of possible mechanical forces.

A further feature of the invention as noted above is that output wave forms can be readily controlled by steps taken during the fabrication of the switch. As will be next indicated hereinunder, this control is effected by judicious selection of the configuration of the window provided in the shutter.

Figure 8:
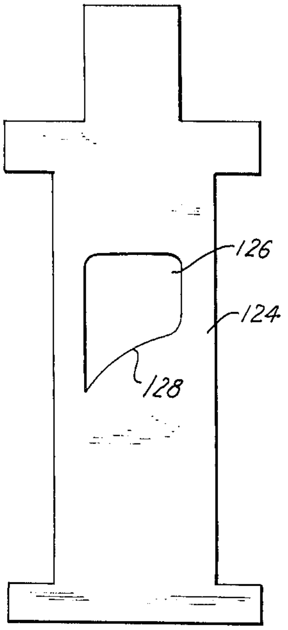
FIGURE 8 illustrates a variant whereby the shape of the output wave form is controlled.

It will be understood that the amount of light to which a photoelectric cell or photoconductor is exposed controls the characteristic exhibited thereby. Thus, if a photoelectric cell is exposed to a light signal of controlled intensity, or having a controlled rate of change, the exhibited characteristic will follow accordingly. The rate of change of the light intensity to which the photoelectric cell is exposed can be controlled by the shape of window or opening employed in the shutter of the particular switch under consideration. A specific shutter 124 is illustrated in FIG. 8, with a window 126 being provided in this shutter. It will be noted that the window is provided at its cutting or leading edge 128 with a particular configuration adapted for controlling the rate of exposure of the associated light responsive device to the associated light source to obtain a particular type of output signal. Thus, for example, square, saw-tooth and sinusoidal output signals may be obtained.

Figure 9:
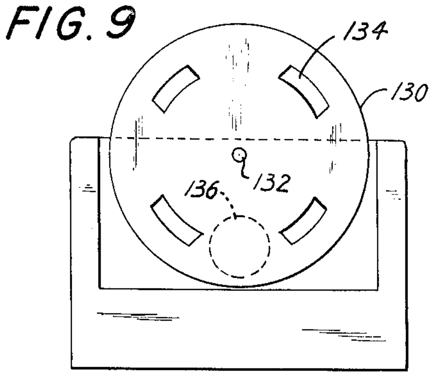
FIGURE 9 illustrates diagrammatically a further embodiment of the invention.

In FIG. 9 is illustrated another of the many types of shutters which may be employed, there being illustrated in this figure a rotary disc 130 rotatable on a pin 132, the disc being provided with a plurality of openings 134 by means of which a light responsive device 136 is exposed to a light source (not shown).

Although the structures of the invention are susceptible of various modes of manufacture, a preferred method in accordance with the invention comprises forming complementary block sections adapted for being juxtaposed in face-to-face relation along a common longitudinal axis and forming bores in each section and passages connected to the bores and in turn having a common axis with the block sections aligned on said longitudinal axis. This method further comprises forming a slot in one of the juxtaposed faces, the slot being arranged in intersecting relationship with the second said axis. Finally, the method comprises placing a shutter in the slot with a light source and a light responsive element being respectively positioned in the bores.

In further accordance with the method, a second slot (such as the slot 58 of FIGS. 3 and 4) is arranged transversely of the first said slot, transverse extension being formed on the shutter for accommodation in the second slot whereby the shutter is locked to the block. Additionally, the method contemplates mounting a resilient member on one of the sections to engages the shutter and yieldingly resist displacement thereof.

Although some preferred embodiments have been described relative to both the apparatus and method of the invention, there will now be obvious to those skilled in the art many modifications and variations of these embodiments. Such modifications and variations will not, however, depart from the scope of the invention if defined by the following claims.

What is claimed is:

1. A switch comprising a substantially solid block defining spaced receptacles and a passage connecting said receptacles, said block being further provided with an elongated rectilinear interior slideway of predetermined length and breadth, said slideway being located between said receptacles and in intersecting relationship with said passage, a light source in one of said receptacles, a light responsive element in the other of said receptacles, said light source being adapted for transmitting light via said passage to said light responsive element, a light intercepting element rectilinearly displaceable in said slideway between a normal position of rest and an active position for selectively blocking light transmitted by said source, said light intercepting element being supported by said block and extending externally thereof, and means within said block engaging the light intercepting element and yieldably holding the same in said normal position of rest in which the light interception element extends most fully from the said block, said light intercepting element comprising an elongated member in said slideway and means extending laterally on said elongated member and spaced longitudinally thereof at a distance greater than said predetermined length so that said elongated member is adapted for limited displacement in said slideway, said block constituting with said light source, light responsive element and light intercepting element a portable self-contained unit.

2. A switch as claimed in claim 1 wherein the first said means comprises at least one spring mounted within said block and engaging said light intercepting element.

3. A switch as claimed in claim 1 wherein the second said means comprises lateral extensions on said elongated member.

4. A switch as claimed in claim 1 wherein the elongated member is provided with a window for the passage of light from the light source to the light responsive element.

5. A switch as claimed in claim 1 wherein the second said means comprises a key mounted on said elongated member externally of said block.

6. A switch as claimed in claim 1 comprising additional light sources in said block and additional light intercepting elements adapted for selectively exposing the light responsive element to the latter said light sources.

7. A switch as claimed in claim 1 comprising a further light intercepting element interposed between said light source and light responsive element.

References Cited by the Examiner

UNITED STATES PATENTS

| | | | |
|---|---|---|---|
| 2,100,934 | 11/1937 | Berger | 250—208 X |
| 2,160,603 | 5/1939 | Sagebeer | 250—237 X |
| 2,265,149 | 5/1939 | Crane et al. | 250—237 X |
| 2,342,245 | 2/1944 | Bruce et al. | 250—208 X |
| 2,408,754 | 10/1946 | Bush | 250—208 X |
| 2,438,825 | 3/1948 | Roth | 250—208 |
| 2,872,590 | 2/1959 | Leavens | 250—208 X |
| 2,920,209 | 1/1960 | Asten | 250—239 |
| 2,998,530 | 8/1961 | Marshall | 250—208 |
| 3,011,379 | 12/1961 | Corwin | 250—229 X |
| 3,023,318 | 2/1962 | Jones | 250—239 X |
| 3,102,227 | 8/1963 | De Gier | 250—209 X |

RALPH G. NILSON, *Primary Examiner.*

WALTER STOLWEIN, *Examiner.*